United States Patent
Caudron et al.

(10) Patent No.: US 11,391,316 B2
(45) Date of Patent: Jul. 19, 2022

(54) FASTENER COVER FOR CAPTIVE EFFECT

(71) Applicant: PRATT & WHITNEY CANADA CORP., Longueuil (CA)

(72) Inventors: Marc-Andre Caudron, St-Philippe (CA); Yves Isabel, St-Hubert (CA)

(73) Assignee: PRATT & WHITNEY CANADA CORP., Longeuil (CA)

( * ) Notice: Subject to any disclaimer, the term of this patent is extended or adjusted under 35 U.S.C. 154(b) by 252 days.

(21) Appl. No.: 16/743,395

(22) Filed: Jan. 15, 2020

(65) Prior Publication Data
US 2021/0215191 A1 Jul. 15, 2021

(51) Int. Cl.
*F16B 21/18* (2006.01)
*F16B 41/00* (2006.01)
*F01D 25/24* (2006.01)

(52) U.S. Cl.
CPC ............ *F16B 41/002* (2013.01); *F01D 25/24* (2013.01); *F05D 2230/72* (2013.01)

(58) Field of Classification Search
CPC .................................................. F16B 41/002
USPC ................................ 411/103, 107, 108, 353
See application file for complete search history.

(56) References Cited

U.S. PATENT DOCUMENTS

| | | | |
|---|---|---|---|
| 2,831,520 A * | 4/1958 | Clarke .................. | F16B 5/0208 411/349 |
| 3,115,177 A | 12/1963 | Wisniewski | |
| 4,041,238 A * | 8/1977 | Penczak ................. | H02G 3/185 174/489 |
| 4,442,993 A * | 4/1984 | Tseng .................... | F16B 21/165 248/327 |
| 4,930,959 A * | 6/1990 | Jagelid .................. | E06B 1/6076 411/107 |
| 6,419,192 B1 * | 7/2002 | Riecke .................. | F16B 41/002 248/65 |
| 6,464,438 B1 * | 10/2002 | Dowling ............... | F16B 5/0208 411/107 |
| 6,709,214 B1 * | 3/2004 | Angehrn ............... | E04D 3/3603 411/533 |
| 8,696,277 B2 * | 4/2014 | Wagner ................ | F16B 41/002 411/108 |
| 9,180,564 B2 | 11/2015 | Blanc | |
| 9,694,968 B2 * | 7/2017 | Roesler ................ | A61B 17/865 |
| 10,323,675 B2 * | 6/2019 | Oso ........................ | F16B 37/14 |
| 2010/0107406 A1 * | 5/2010 | Feye-Hohmann .... | F16B 41/002 29/747 |
| 2011/0261920 A1 * | 10/2011 | Friedrich ............... | G21C 3/334 376/352 |
| 2014/0241833 A1 * | 8/2014 | Grossmann ........... | F16B 41/002 411/500 |

FOREIGN PATENT DOCUMENTS

EP 0549403 A1 6/1993
GB 765438 1/1957

* cited by examiner

*Primary Examiner* — Gary W Estremsky
(74) *Attorney, Agent, or Firm* — Norton Rose Fulbright Canada LLP

(57) ABSTRACT

A hollow cover is provided for retaining a fastener captive on a removable part. The cover has an internal surface tapering from a first open end to a second open end. The first open end is sized to permit positioning of the fastener inside the hollow cover. The second open end is sized to block passage of the fastener. The second open end defining a tool opening configured to receive a tool for engagement with the fastener inside the hollow cover.

16 Claims, 9 Drawing Sheets

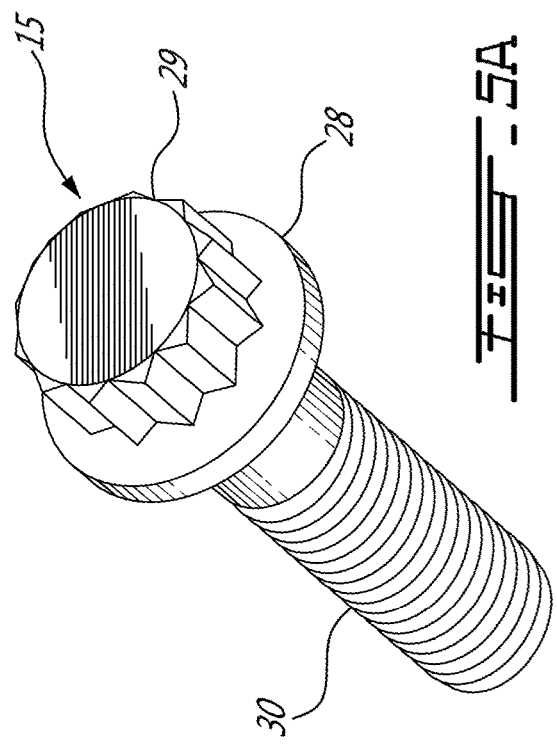
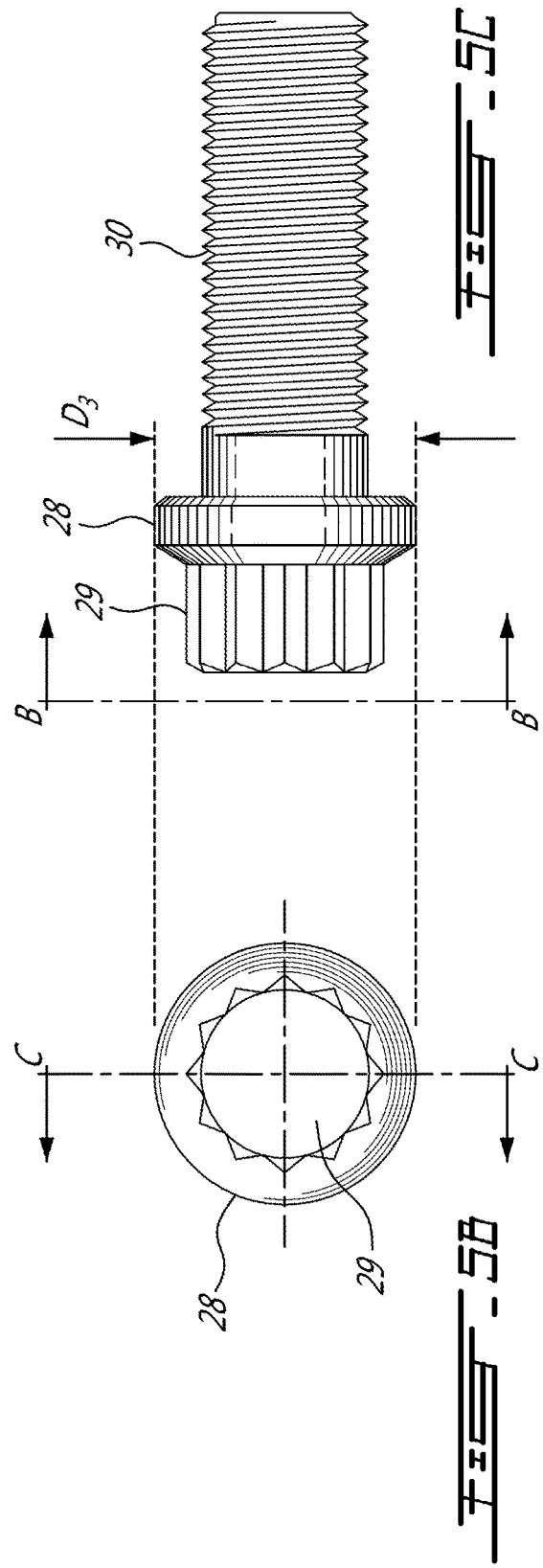

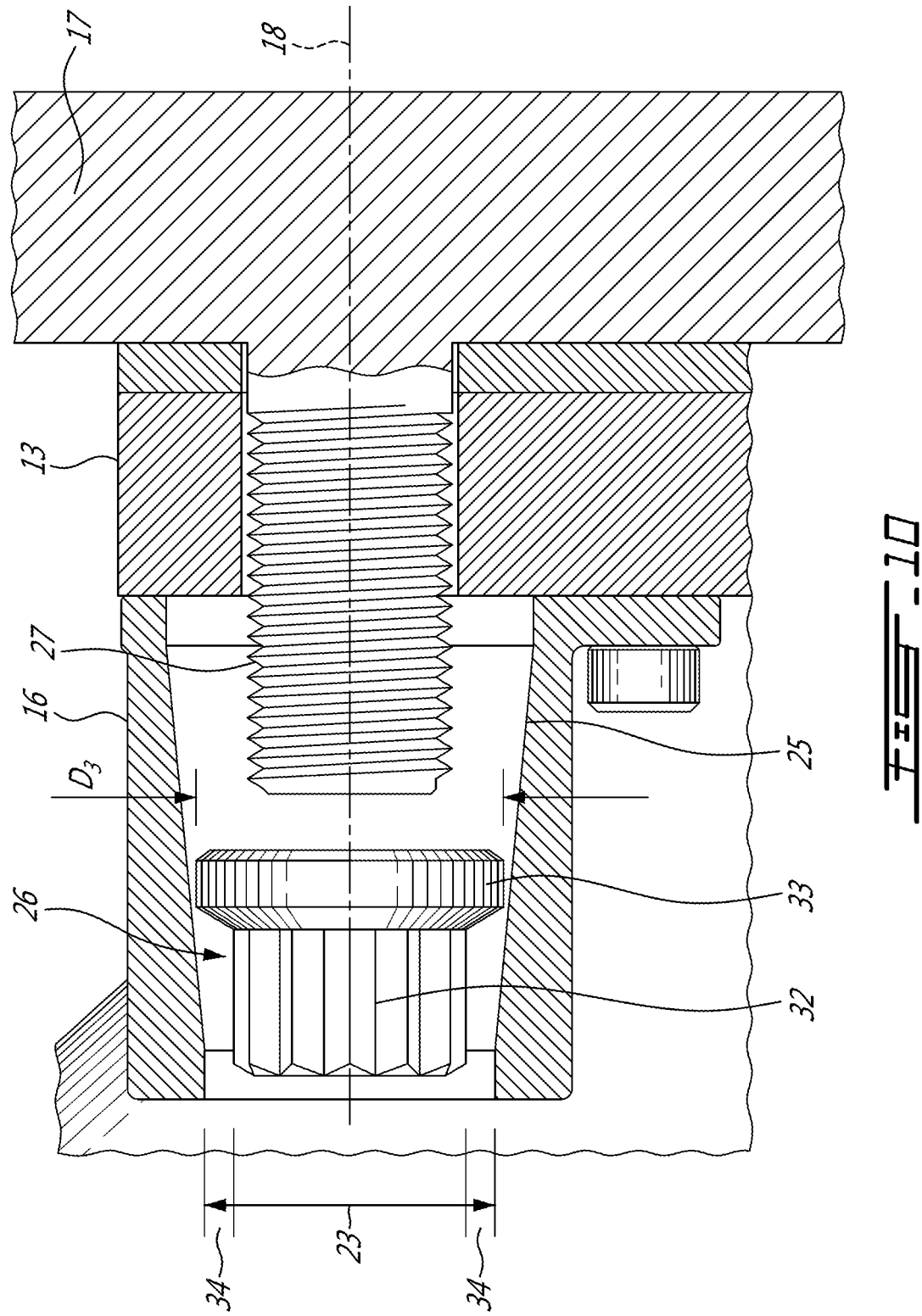

FASTENER COVER FOR CAPTIVE EFFECT

TECHNICAL FIELD

The disclosure relates generally to fasteners and, more particularly, to a cover to retain a mechanical fastener captive on a removable part.

BACKGROUND

The manufacture, maintenance and record keeping for all parts of an aircraft engine and fuselage involves strict compliance with procedures to track the origin, placement and even disposal of all parts, including mechanical fasteners. Fasteners that are counterfeit have been reused or otherwise do not meet the strict tracking and technical specifications for aircraft use can result in dangerous failures.

Improvement is desirable to control the handling of fasteners during all stages of their life cycle, and particularly when removed and replaced during assembly, inspection and maintenance.

SUMMARY

In accordance with one aspect, there is provided a device for retaining a fastener captive on a removable part, the device comprising: a hollow cover having an internal surface tapering from a first open end to a second open end, the first open end sized to permit positioning of the fastener inside the hollow cover, the second open end sized to block passage of the fastener, the second open end defining a tool opening configured to receive a tool for engagement with the fastener inside the hollow cover.

In accordance with another aspect, there is provided an assembly comprising: a first part and a second part having a common fastener alignment axis; a hollow cover mounted to the first part, the hollow cover having an internal surface extending from an open proximal end to an open distal end, the open proximal end centered on the alignment axis, the internal surface having a distal diameter at said open distal end greater than a proximal diameter at said open proximal end; and a fastener disposed within the hollow cover, the fastener having an exterior surface with a diameter less than said distal diameter and greater than said proximal diameter; wherein the exterior surface of the fastener is engaged with the internal surface in a captive position and the exterior surface is disengaged from the internal surface in an installed position.

In accordance with a still further aspect, there is provided a method of retaining a flange screw captive on a removable part, the flange screw engaged with the removable part and having a head with a flange, the method comprising: trapping the head and the flange of the flange screw between a surface of the removable part and a hollow cover, including mounting the hollow cover on the removable part over the head of the flange screw.

Further details of these and other aspects of the subject matter of this application will be apparent from the detailed description included below and the drawings.

DESCRIPTION OF THE DRAWINGS

FIGS. 5A to 5C show a flanged double hex head screw fastener generally used in aircraft engine assembly, namely: an isometric view of the screw; a top view along line B-B; and a sectional view along line C-C, respectively.

FIG. 10 shows an axial sectional view of an alternative assembly wherein the fastener comprises a nut that is shown disengaged from a threaded stud.

DETAILED DESCRIPTION

The present description and drawings relate to the examples of a fastener retention cover suitable for use on an engine tooling, engine transportation cradle and/or an aircraft engine. Control, documentation and tracking of mechanical fasteners used in aircraft engines and aircraft structures is required to comply with strict regulations that aim to ensure that safe procedures and technical specifications are followed. However, it is understood that the disclosure herein relates to any machine or structure that employs removable multiple use mechanical fasteners, including screws, bolts, nuts and washers.

Mechanical fasteners, such as screws, bolts, nuts and washers, are used to removably secure parts together in machinery and structures. When such reusable fasteners are used, the parts can be separated and rejoined repeatedly unless the fasteners are damaged, lost or misplaced. The removed fasteners can be placed on a magnetic tray to avoid loss. However, when multiple sizes and types of fasteners are used, the goal of replacing the correct fasteners into the same locations from which they have been removed can be time consuming. Assembly errors can damage the fasteners or the joined parts if a mismatch occurs.

Also, fasteners can be lost within the bowels of a complex machine causing physical damage to the fastener or machine parts on which a fastener falls. Until a lost fastener is retrieved, productive assembly or maintenance work is delayed. Furthermore, a lost fastener can be a significant danger to personnel and machine operation.

In complex machines, a lost fastener cannot simply be replaced without documenting the origin and specifications of the replacement fastener. Expensive fasteners that are damaged may be destroyed before disposal or recycling to prevent unregulated reuse by negligent or unskilled mechanics.

Figure 1:
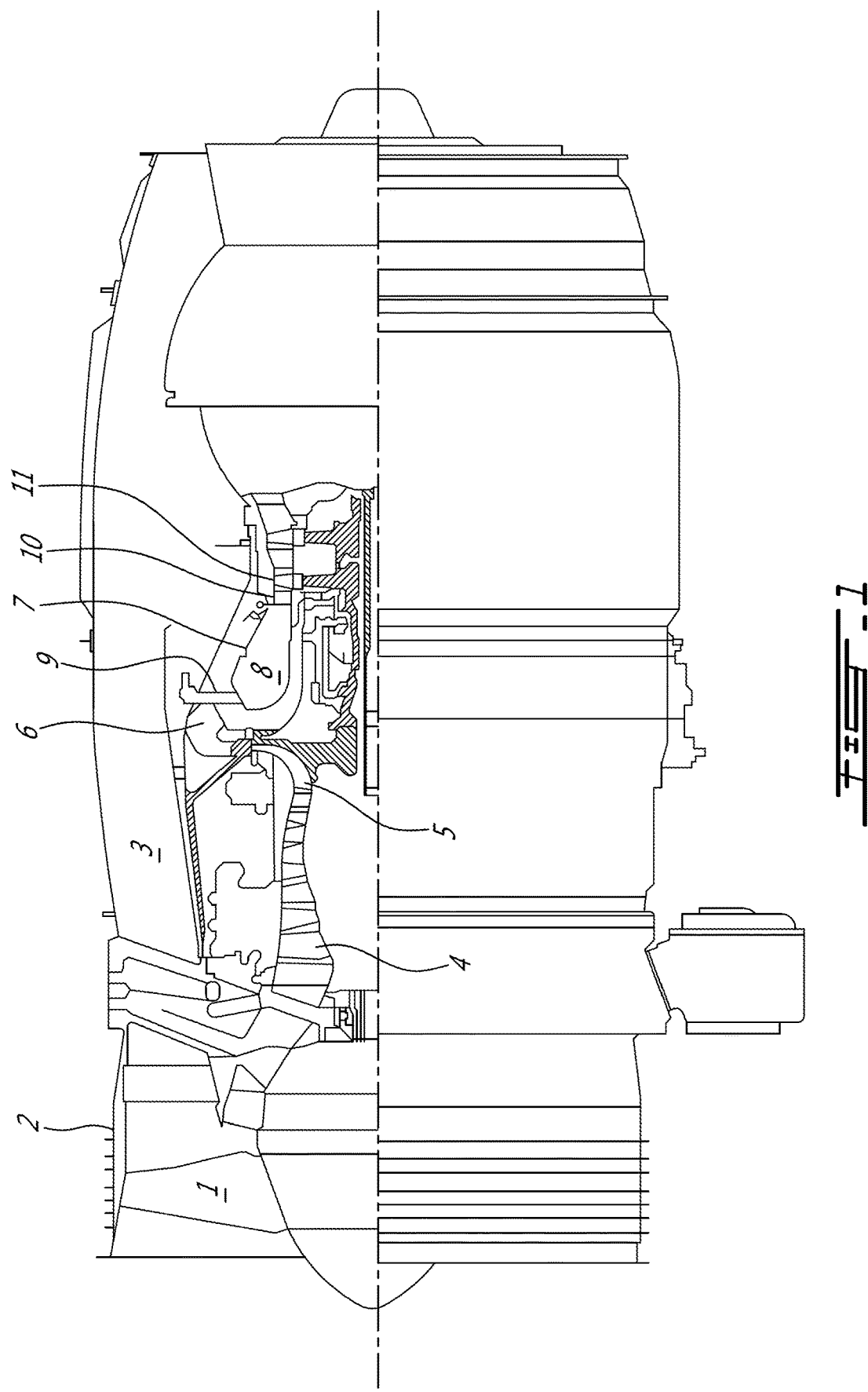
FIG. 1 shows an axial cross-section view of a turbo-fan gas turbine engine.

FIG. 1 shows an axial cross-section through an example aircraft engine. According to the illustrated embodiment, the aircraft engine is a turbo-fan gas turbine engine. However, it is understood that the aircraft engine could adopt various other forms. For instance, it could be a turboshaft, a turboprop or even a compounded engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling the turbines to eventually mix with the hot gases from the combustor and pass over the nozzle guide vane 10 and turbine blades 11 before exiting the tail of the engine as exhaust.

The aircraft engine is assembled from various parts that are secured together with removable multiple use mechanical fasteners, including among others screws, bolts, nuts and washers. During the service life of an aircraft engine, the parts are repeatedly disassembled by removing mechanical fasteners for inspection and maintenance, and then are reassembled. Controlling the handling and reuse of mechanical fasteners is the focus of the present description using an aircraft engine as one example application.

References to a "screw" are intended to include a bolt, as is commonly known and used in the art, since a screw has an external helical ridge on a shank that is mated with an internal helical thread groove of a threaded bore within a nut or a larger massive part. Hence a bolt is a subset of the generic term "screw". Likewise "nut" is intended to describe a relatively small removable rotatable fastener component used in conjunction with a bolt.

Figure 2:
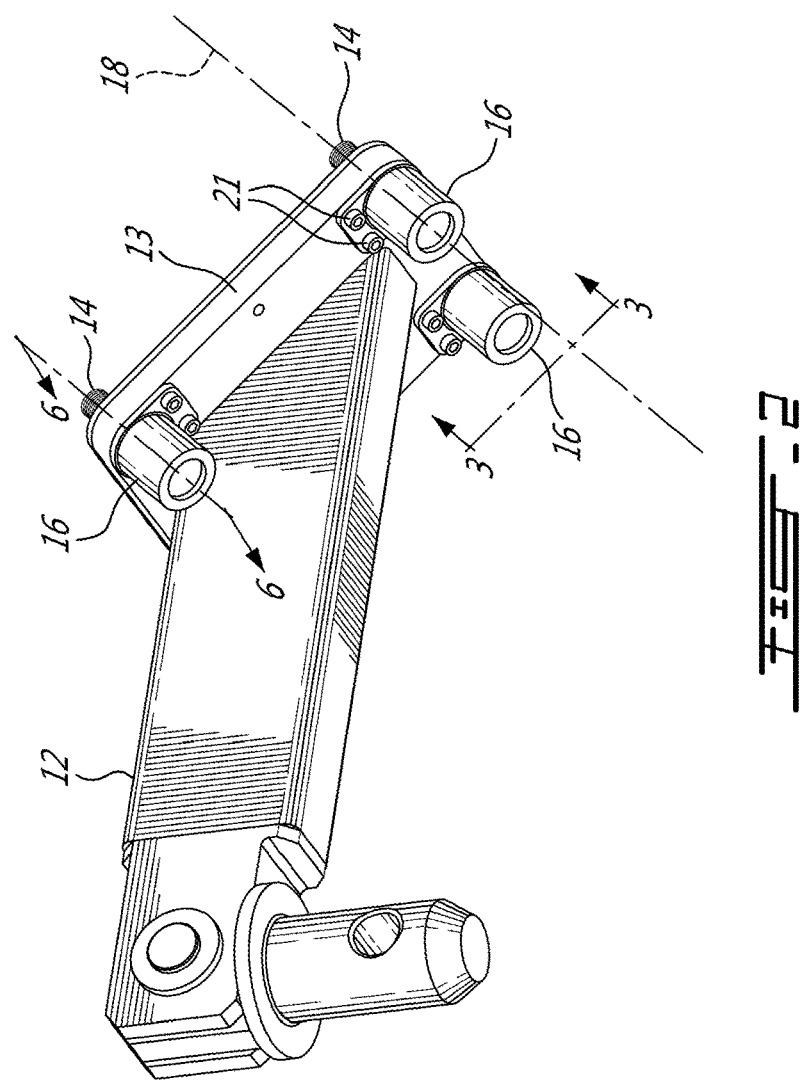
FIG. 2 shows an isometric view of an example machine part assembly with a mounting plate secured at each corner with four fasteners, the fasteners being retained captive within a hollow cover.
Figure 6:
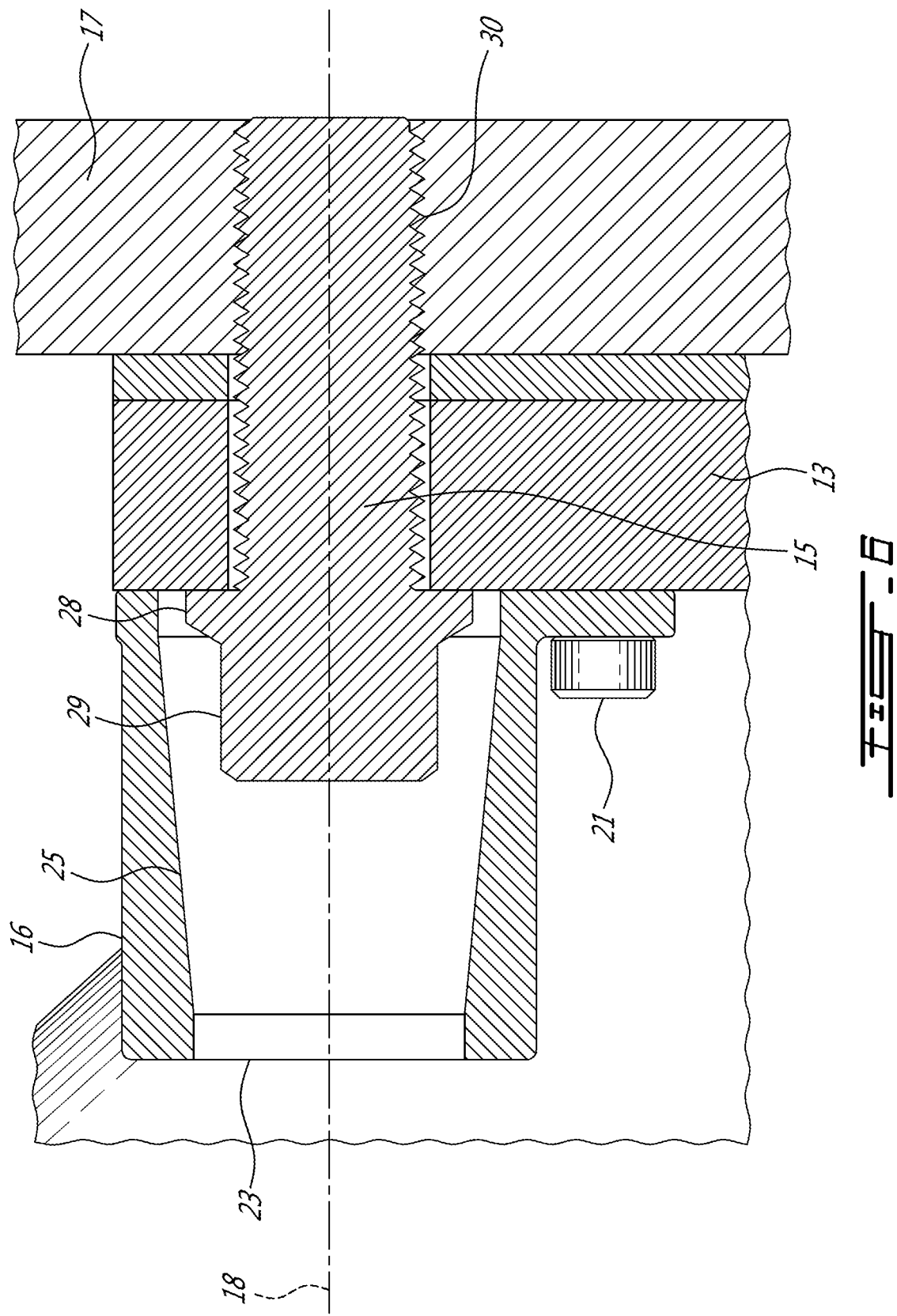
FIG. 6 shows an axial sectional view along line 6-6 of FIG. 2, through the assembled screw, cover and mounting plate.

Referring to FIG. 2, an example bracket 12 is shown with a mounting plate 13 with fasteners 14 at each corner of plate 13. In the examples shown in FIGS. 2-8, the fasteners 14 are screws 15 (FIGS. 4, 6, 7 and 9) having their respective head retained within a hollow cover 16 (FIGS. 3, 4(A)-(C)). The screws 15 are used to removably secure the mounting plate 13 to a second part 17 (see FIG. 6) on a common fastener alignment axis 18.

Figure 3:
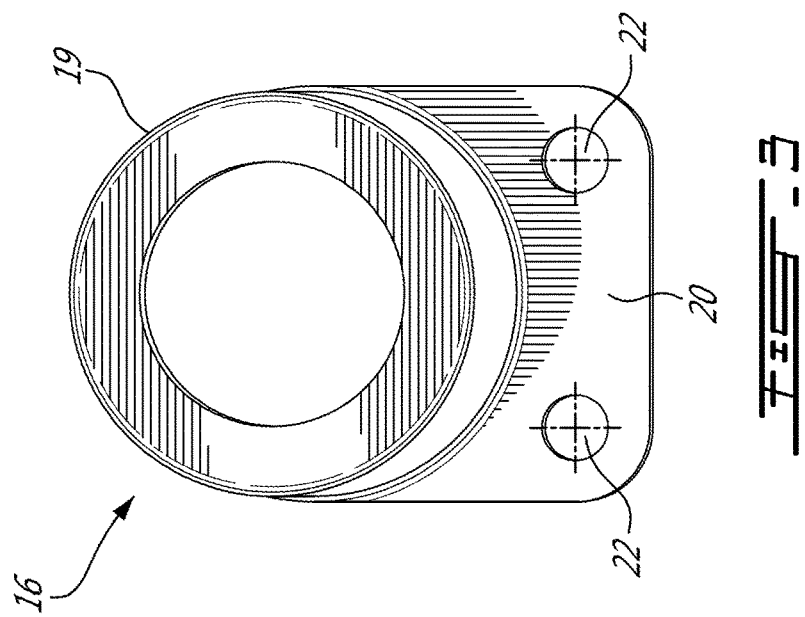
FIG. 3 shows a top view of the hollow cover along line 3-3 of FIG. 2.

As seen in FIG. 3, the cover 16 has a generally cylindrical body 19 having a base including a radially extending cover flange 20 secured to the mounting plate 13 with removable fasteners 21 (see FIG. 2) through two mounting holes 22 (see FIG. 3).

Figure 4C:
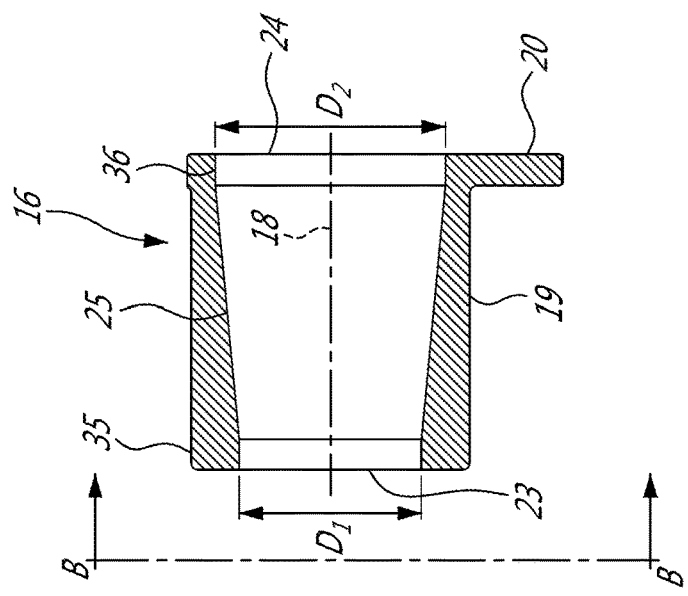
FIGS. 4A to 4C show an isometric view of the cover; a top view along line B-B; and a sectional view along line C-C, respectively.
Figure 4B:
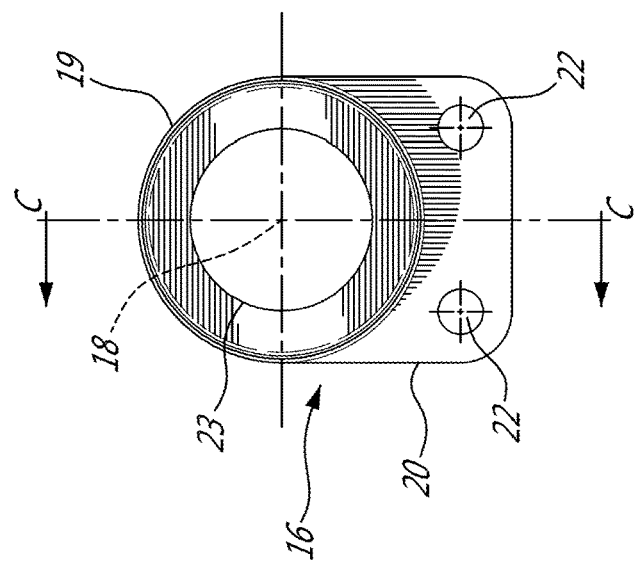
Figure 4A:
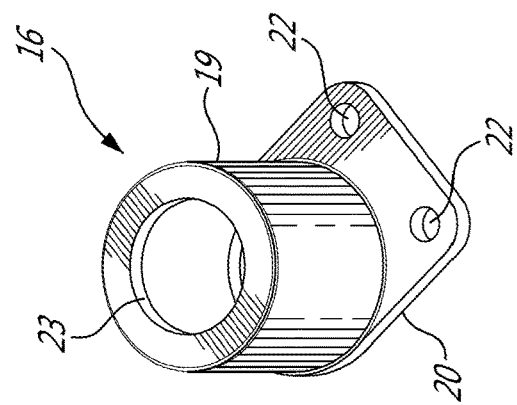

FIGS. 4(A)-(C) show further details of the cover 16. The cover 16 has an open proximal end 23 (also herein referred to as the second end); an open distal end 24 (also herein referred to as the first end at which the mounting flange 20 is provided); and a conical internal surface 25 centered on the alignment axis 18. The internal surface 25 tapers from the first end to the second end of the body 19. As will be seen hereinafter, the taper section of the inner section of the cover 16 allows keeping the fastener head aligned with the tool receiving opening at the open proximal end 23 when the fixture is installed upside down. This helps mating the installation tool (e.g. a screw socket) with the fastener head. It can be appreciated from FIG. 4c that the internal surface 25 has a distal diameter $D_2$ greater than the proximal diameter $D_1$.

FIGS. 5(A)-(C) show an example fastener, being a shoulder screw 15. FIG. 10 shows an alternative example fastener, being a nut 26 mountable on a threaded stud 27 fixed to the second part 17. In both examples, the fastener (screw 15, nut 26) is disposed within the hollow cover 16 and is retained within the interior space circumscribed by internal surface 25 of the cover 16.

FIGS. 5(A)-(C) show the screw 15 having an exterior surface that includes a fastener flange 28 extending radially outward of a fastener head 29. The shank 30 includes helical screw threads. The fastener head 29 is shown as a double hexagonal profile suitable for use with a double hexagonal head socket wrench tool 31 shown in FIGS. 7-8. The screw 15 illustrated is typical of aircraft engine use with a proximal double hexagonal head 29, an intermediate annular flange 28, and a distal shank 30 with a helical thread.

The flange 28 of the screw 15 has a diameter $D_3$ that is less than the distal diameter $D_2$ of the cover 16 and greater than the proximal diameter $D_1$ of the cover 16. As a result, the screw head 29 and flange 28 (with a diameter $D_3$) can be inserted into the open distal end 24 (with a diameter $D_2$) during assembly. However, since the screw head 29 and flange 28 (with a diameter $D_3$) is larger than the open proximal end 23 (with a diameter $D_1$), the screw 15 is captive within the cover 16.

Further since the cover 16 has a tapering internal surface 25 (conical in the illustrated example), the screw 15 self-centers within the cover 16 when moved axially toward the open proximal end 23. The exterior surface of the screw flange 28 engages with the conical internal surface 25 in the captive position shown in FIG. 9. In the installed position in FIG. 6, the exterior surface of the screw flange 28 is disengaged from the conical internal surface 25 of the cover 16.

FIG. 10 shows an alternative assembly where the captive fastener is a nut 26 that is shown disengaged from a threaded stud 27 in a captive position. The threaded stud 27 can be welded to the second part 17 for example. A further alternative could include a through bore in the second part 17 and a bolt head to the right side as drawn, which would also include a captive nut 26 in an identical position. The second part 17 aligned on the common fastener alignment axis 18 can include a smooth cylindrical through bore to receive a bolt, an internally threaded cylindrical bore to engage the screw 15 or a threaded stud 27 with a distal end secured or welded to the second part 17.

The nut 26 has a double hexagonal head 32 accessible through the tool receiving opening at the open proximal end 23 of the cover 16. The flange 33 of the nut 26 also has the same diameter $D_3$ which is less than the diameter $D_1$ of the open proximal end 23. The exterior surface of the flange 28 engages with the conical internal surface 25 of the cover 16 in the captive position shown in FIG. 10. In the installed position (not shown), the exterior surface of the nut flange 33 is disengaged (not captive) from the conical internal surface 25 of the cover 16, and is threaded on the stud 27 to secure the mounting plate 13 and second part 17 together. Accordingly, the nut 26 cannot escape and is captive within the conical internal surface 25 of the cover 16.

Figure 7:
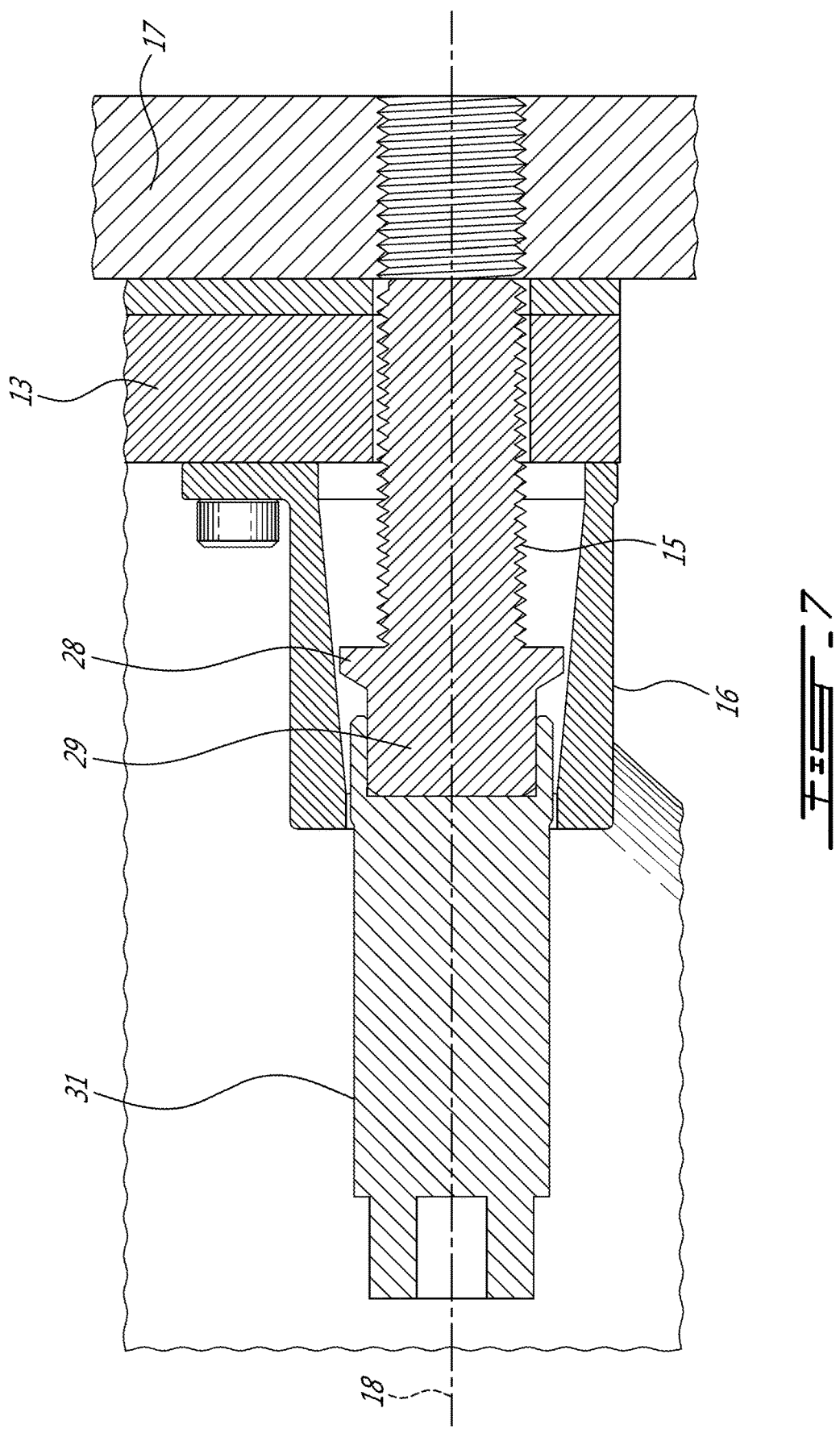
FIG. 7 shows an axial sectional view a screw that has been removed, a socket wrench tool, cover and mounting plate.
Figure 8:
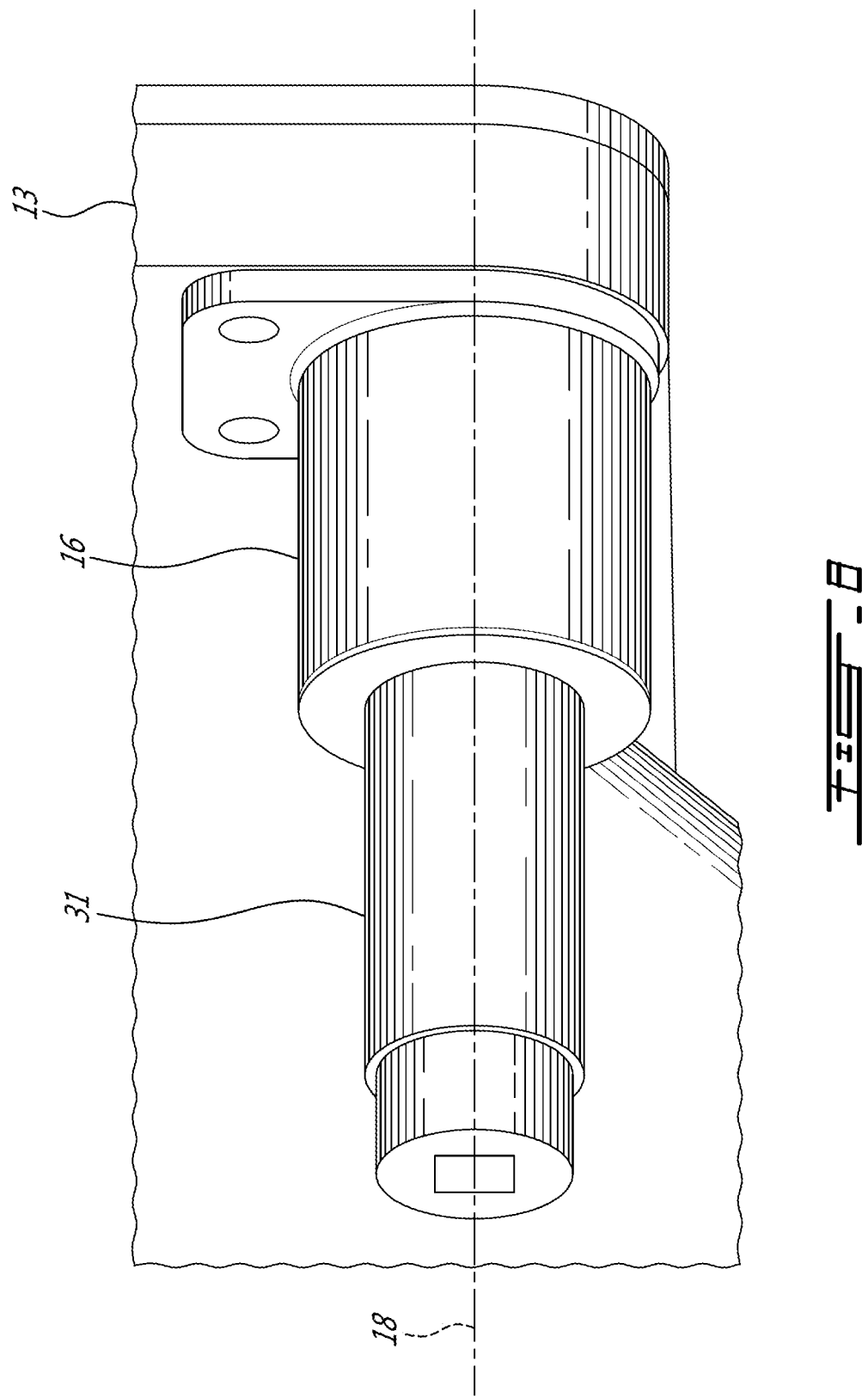
FIG. 8 shows an isometric view of the socket wrench tool, cover and mounting plate of FIG. 7, the removed screw being hidden from view within the cover.
Figure 9:
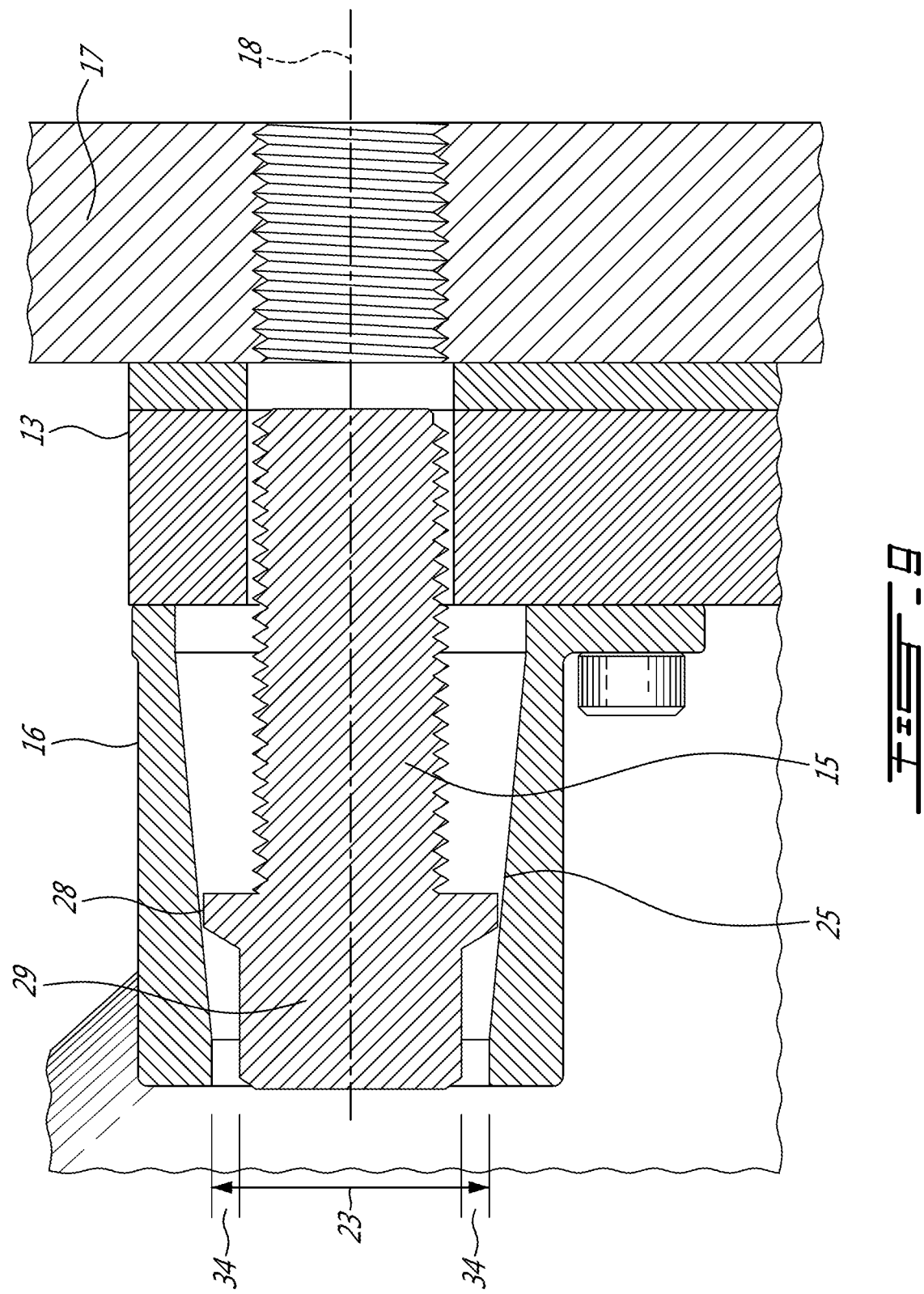
FIG. 9 shows an axial sectional view like FIG. 7, with the socket wrench tool removed.

FIGS. 7-8 show the use of a cylindrical socket wrench tool 31. The distal end of the tool 31 is inserted into the open proximal end 23 of the cover 16 to engage the double hexagon head 29 of the screw 15. In the alternative of FIG. 10, the tool 31 is inserted into the open proximal end 23 of the cover 16 to engage the double hexagon head 32 of the nut 26 in a like manner. Referring to FIGS. 9 and 10, the fastener head 29, 32 and the open proximal end 23 define an annular tool access gap 34 therebetween.

In the example shown in FIG. 4(B) the open proximal end 23 of the hollow cover 16 includes a cylindrical bore 35 of proximal diameter $D_1$. The cylindrical bore 35 engages with the external cylindrical surface of the tool 31 and serves to guide the tool 31 into engagement with the fastener head 29, 32, since visibility is very limited. The proximal internal diameter $D_1$ of the open proximal end 23 is selected to exceed the external diameter of the double hexagonal head socket wrench tool 31. Furthermore, the open distal end 24 of the hollow cover 16 may include a cylindrical bore 36 of the distal diameter $D_2$, which can retain a washer (not shown).

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the captive fastener can be a nut 26 or a screw 15. The second part 17 can include a smooth cylindrical through bore to receive a bolt, an internally threaded cylindrical bore to engage the screw 15 or a threaded stud 27. Yet further modifications could be implemented by a person of ordinary skill in the art in view of the present disclosure, which modifications would be within the scope of the present technology.

What is claimed is:

1. A device for removably securing a first part to a second part, the device comprising:
    a fastener having a head, a flange projecting from the head, and a threaded shank;
    a hollow cover removably securable to the first part over the head of the fastener, the hollow cover having an internal surface extending from a first open end to a second open end, the first open end sized to permit positioning of the fastener inside the hollow cover, the second open end sized to block passage of the fastener, the second open end defining a tool opening configured to receive a tool for engagement with the head of the fastener inside the hollow cover, the internal surface having a conical surface converging to the second open end, the tool opening and the conical surface being centrally aligned, the hollow cover further having a flange at the first open end, and
    removable fasteners engageable with the flange of the hollow cover for detachably securing the hollow cover to the first part,
    wherein the flange of the fastener is engaged with the conical surface in a captive position at a location spaced from the second open end, the head of the fastener aligned with the tool opening when the fastener is received in the captive position, and wherein the flange of the fastener is disengaged from the conical surface in an installed position, the head of the fastener located at the first open end of the hollow cover when the fastener is in the installed position.

2. The device defined in claim 1, wherein the internal surface has a cylindrical section at said second open end.

3. The device defined in claim 1, wherein the internal surface has a distal diameter at said first open end which is greater than a proximal diameter at said second open end.

4. The device defined in claim 3, wherein the head of the fastener has a double hexagonal profile, and wherein the proximal diameter of the second open end is selected to exceed a double hexagonal head socket wrench tool diameter.

5. An assembly comprising:
    a first part and a second part having a common fastener alignment axis;
    a hollow cover mounted to the first part, the hollow cover having an internal surface extending from an open proximal end to an open distal end, the open proximal end centered on the alignment axis, the internal surface having a distal diameter at said open distal end greater than a proximal diameter at said open proximal end, the internal surface including a conical surface centered on the alignment axis and tapering in a direction away from the open distal end; and
    a fastener disposed within the hollow cover, the fastener having a flange with an exterior surface with a diameter less than said distal diameter and greater than said proximal diameter;
    wherein the exterior surface of the flange of the fastener is engaged with the conical surface in a captive position, the conical surface aligning the fastener with the open proximal end when the fastener is axially moved toward the open proximal end to the captive position, and wherein the exterior surface is disengaged from the conical surface in an installed position.

6. The assembly according to claim 5 wherein the flange extends radially outward of a fastener head, the fastener head retained captive between the hollow cover and the first part.

7. The assembly according to claim 6 wherein the fastener head and the open proximal end define an annular tool access gap therebetween.

8. The assembly according to claim 5 wherein the hollow cover includes a base secured to the first part with removable fasteners.

9. The assembly according to claim 8 wherein the base comprises a radially extending flange with holes for receiving the removable fasteners.

10. The assembly according to claim 5 wherein the fastener is selected from the group consisting of: a flange screw; a flange bolt; and a flange nut.

11. The assembly according to claim 10 wherein the fastener comprises a screw with a proximal double hexagonal head, an intermediate annular flange, and a distal shank with a helical thread.

12. The assembly according to claim 5 wherein the proximal diameter of the open proximal end is selected to exceed a double hexagonal head socket wrench tool diameter.

13. The assembly according to claim 5 wherein the second part has, aligned on the common fastener alignment axis, one of: a cylindrical bore; an internally threaded cylindrical bore; and a threaded stud with a distal end secured to the second part.

14. A method of retaining a flange screw captive on a removable part, the flange screw engaged with the removable part and having a head with a flange, the method comprising:
    trapping the head and the flange of the flange screw between a surface of the removable part and a hollow cover having a conical internal surface tapering in a direction away from the removable part, including:
    engaging the flange of the flange screw with the conical internal surface in a captive position,
    mounting the hollow cover on the removable part over the head of the flange screw; and
    disengaging the flange from the conical internal surface in an installed position.

15. The method of claim 14, wherein the hollow cover has a base mounted to the removable part and an opposed open proximal end, the method further comprising:
    inserting a socket wrench tool in the open proximal end;

engaging the socket wrench tool on the head of the flange screw; and rotating the socket wrench tool and the flange screw to move the flange screw between the captive position and the installed position.

16. The method of claim 15, wherein the base of the hollow cover includes a radially extending cover flange secured to the removable part with removable fasteners, the method comprising:

removing the removable fasteners from the hollow cover;

removing the captive fastener from the hollow cover;

installing a replacement fastener into the hollow cover; and replacing the removable fasteners to secure the hollow cover to the removable part.

* * * * *